June 20, 1939.  P. H. FARREN  2,163,514
TORQUE CONTROLLED CLUTCH
Filed Aug. 17, 1938  2 Sheets-Sheet 2
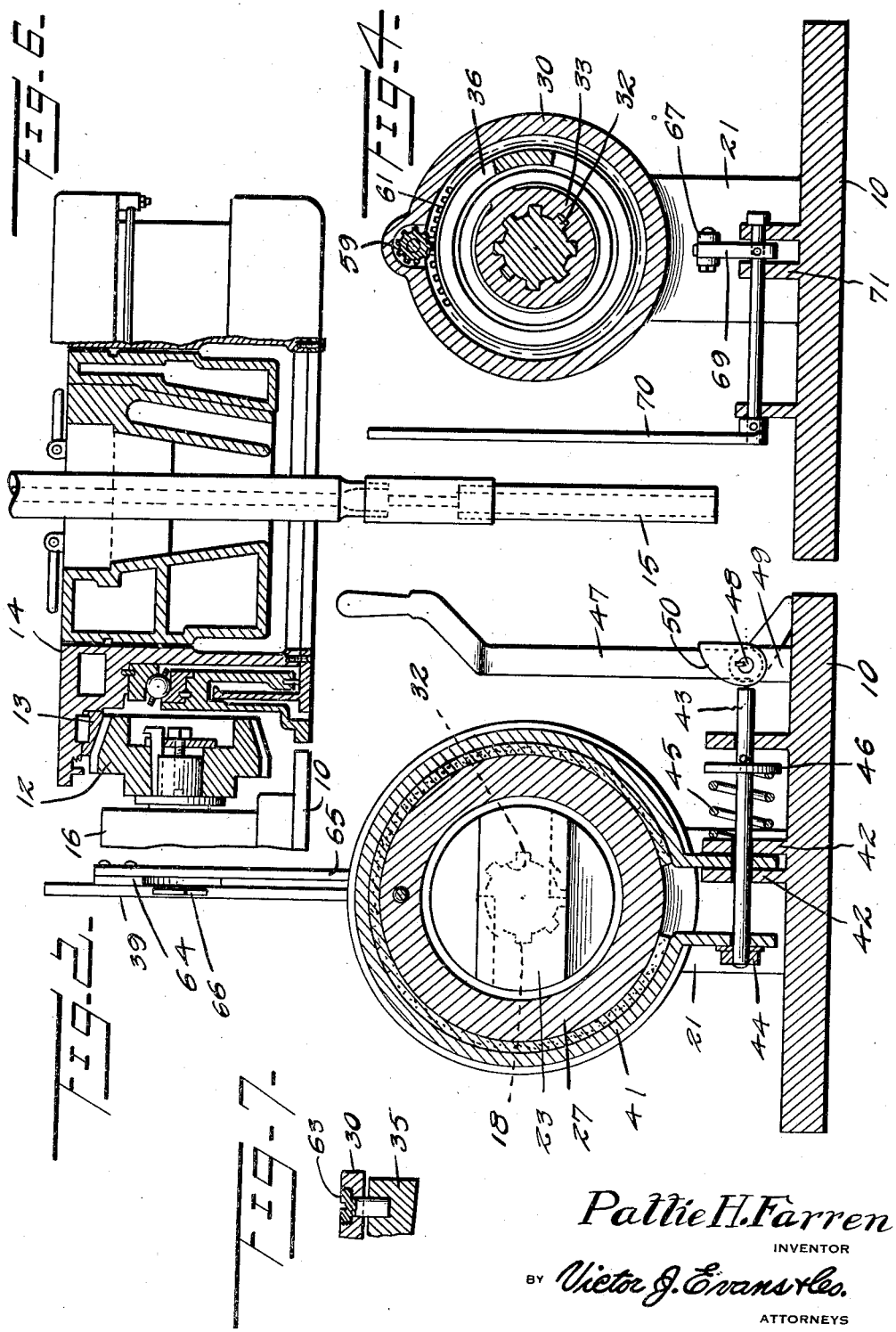
Pattie H. Farren
INVENTOR
BY Victor J. Evans & Co.
ATTORNEYS Patented June 20, 1939

2,163,514

UNITED STATES PATENT OFFICE 2,163,514

TORQUE CONTROLLED CLUTCH

Pattie H. Farren, Walla Walla, Wash.

Application August 17, 1938, Serial No. 225,426

6 Claims. (Cl. 192—17)

This invention relates to torque controlled clutches and has for an object to provide apparatus of this type for automatically cutting off the drive means when the torque required to operate the driven means becomes abnormal, the invention having particular utility in operating oil well drills to disconnect the drill from the power when the torque becomes so great as to twist off the drill in the hole due to sudden sticking of the drill bit or caving of the walls of the hole.

A further object is to provide apparatus of this type which will make possible high speed in rotary well boring operations, which will provide an automatic brake means to prevent back spin when the clutch is thrown out, which will prevent sudden overload being placed on the drill pipe during boring operations, which will eliminate the usual close attention of the driller, and which will provide full safety at all times for the operator and equipment during drilling operations.

A further object is to provide apparatus of this type which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a longitudinal sectional view of a torque controlled clutch constructed in accordance with the invention.

Figure 2 is a cross sectional view taken on the line 2—2 of Figure 1.

Figure 3 is a longitudinal sectional view taken on the line 3—3 of Figure 1 showing the brake drum operating means.

Figure 4 is a cross sectional view taken on the line 4—4 of Figure 1.

Figure 5 is a detail cross sectional view taken on the line 5—5 of Figure 1.

Figure 6 is a fragmentary longitudinal sectional view showing the rotary drill table and driving gear thereof which latter forms part of the invention.

Figure 7 is a detail sectional view taken on the line 7—7 of Figure 1 showing the emergency coupling pin.

Figure 8 is a fragmentary perspective view of the male member of the clutch.

Figure 9 is a fragmentary perspective view of the female member of the clutch.

Referring now to the drawings in which like characters of reference designate similar parts in the various views, the power controlled clutch comprises a base plate 10 upon which is supported a driven shaft 11 terminating in a bevel gear 12 which meshes with the driving gear 13 of the conventional rotary table 14 for actuating the drill 15 in rotary oil well drilling operations. The driven shaft 11 is rotatably mounted in a conventional roller bearing assembly 16 supported upon a pedestal 17 which rises from the base plate.

A driving shaft 18 is splined in a sleeve 19 which is rotatably mounted in a conventional roller bearing assembly 20 supported upon a pedestal 21 which rises from the base plate 10. The driving shaft is equipped at one end with a shift collar 22 and at the opposite end is equipped with a clutch male member 23 having oppositely disposed faces 24 having a pitch of about 8 degrees to constantly tend to feed the male member into the female clutch member 25 which also has companion faces 26 of like pitch. Thus the clutch members have good inter-engagement during rectilinear movement relatively to each other, as best shown in Figures 8 and 9.

A brake drum 27 is bolted to one end of a bearing sleeve 28 which is loose on the sleeve 19. The sleeve 19 is equipped with a sprocket gear 29 which may be connected to any suitable source of power. A cylinder 30 is bolted to the opposite end of the brake drum and projects over the driven shaft 11. Disposed axially in the cylinder is a jack shaft 32 which is aligned axially with both the driven shaft 11 and the driving shaft 18 and is splined in a sleeve 33 which is integral with the female member 25 of the clutch. Thus when the clutch is engaged the jack shaft rotates the cylinder 30, brake drum 27 and bearing sleeve 28 as a unit. By virtue of the spline connection between the jack shaft and the sleeve 33 the jack shaft may move endwise toward and away from the driven shaft 18 as the load varies as will presently appear.

The flexible connection between the jack shaft and driving shaft controlled by the torque on the drill 15 comprises a spline gear 34 which is keyed to the outer end of the jack shaft 32 and is engaged with a nut 35 which is keyed to the driven shaft 11. A helical spring 36 is sleeved on the jack shaft and on the sleeve 33 and is medium of a link 69 which is connected to a hand lever 70 which is pivoted at the bottom to a bracket arm 71 which rises from the base 10.

Since the operation of the device has been described as the description of the parts progressed it is thought that the invention will be fully understood without further explanation.

What is claimed is:

1. In a torque controlled clutch, the combination of a drive shaft, a driven shaft, a jack shaft mounted for sliding and rotary movement intermediate and in alignment with the drive shaft and the driven shaft, a male clutch element carried by the drive shaft, a female clutch element within which the jack shaft slides toward and away from the male element to eject the latter and uncouple the coupling, a torque resisting spring exerting a pressure on the jack shaft in a direction away from the driven shaft, and a flexible coupling connecting the jack shaft to the driven shaft and adapted to feed the jack shaft against the tension of said spring to disconnect said coupling elements when the torque on the driven shaft overcomes the tension of said spring.

2. A torque controlled clutch comprising a driving shaft, a driven shaft, a jack shaft mounted for sliding and rotary movement between and in alignment with the driving shaft and the driven shaft, a male clutch element on the driving shaft, a female clutch element slidably and non-rotatably receiving one end of the jack shaft, a collar on the jack shaft, a collar on the female clutch element, a spring sleeved on the jack shaft between both of said collars and tending to force the jack shaft away from the driven shaft, means for adjusting one of the collars to vary the tension of said spring, and a flexible connection between the other end of the jack shaft and the driven shaft adapted to feed the jack shaft into ejecting engagement with the male clutch element when the torque on the driven shaft overcomes the tension of said spring.

3. In a torque controlled clutch, the combination of a drive shaft, a driven shaft, a jack shaft mounted for sliding and rotary movement intermediate and in alignment with the drive shaft and the driven shaft, a male clutch element carried by the drive shaft, a female clutch element within which the jack shaft slides toward and away from the male element to eject the latter and uncouple the coupling, a torque resisting spring exerting a pressure on the jack shaft in a direction away from the driven shaft, a nut fixed to the driven shaft, and a spline fixed to the jack shaft and adapted to be fed longitudinally of the nut and carry the jack shaft into ejecting engagement with the male clutch element when the torque on the driven shaft exceeds the tension of said spring.

4. In a torque controlled clutch, the combination of a drive shaft, a driven shaft, a jack shaft mounted for sliding and rotary movement intermediate and in alignment with the drive shaft and the driven shaft, a male clutch element carried by the drive shaft, a female clutch element within which the jack shaft slides toward and away from the male element to eject the latter and uncouple the coupling, a torque resisting spring exerting a pressure on the jack shaft in a direction away from the driven shaft, a flexible coupling connecting the jack shaft to the driven shaft and adapted to feed the jack shaft against the tension of said spring to disconnect said coupling elements when the torque on the driven shaft overcomes the tension of said spring, a brake drum integral with said female clutch element, a brake band on said drum, and means connected to the driving shaft and to the brake band for setting the brake band to stop spinning of the parts when said jack shaft disengages said coupling.

5. A torque controlled clutch comprising a drive shaft having a male clutch element provided with faces having a pitch of about 8 degrees, a female clutch element having faces provided with a pitch of about 8 degrees, a driven shaft, a jack shaft slidably and non-rotatably mounted in said female clutch element, a spring sleeved on and connected to the jack shaft and tending constantly to force the drive shaft toward said driven shaft, a nut fixed to the driven shaft and extending over the jack shaft, and a spline gear fixed to the jack shaft engaging said nut, said spline gear being adapted to feed the jack shaft to eject the male coupling element from the female coupling element when the torque on said driven shaft exceeds the tension of said spring, said jack shaft moving endwise back and forth in the female clutch member as the load varies, said pitched faces tending constantly to hold the male and female clutch element in interengaged relationship.

6. In a torque controlled clutch, the combination of a drive shaft, a driven shaft, a jack shaft mounted for sliding and rotary movement intermediate and in alignment with the drive shaft and the driven shaft, a male clutch element carried by the drive shaft, a female clutch element within which the jack shaft slides toward and away from the male element to eject the latter and uncouple the coupling, a torque resisting spring exerting a pressure on the jack shaft in a direction away from the driven shaft, a flexible coupling connecting the jack shaft to the driven shaft and adapted to feed the jack shaft against the tension of said spring to disconnect said coupling elements when the torque on the driven shaft overcomes the tension of said spring, a brake drum integral with the female clutch member, means carried by the brake drum and engaging said spring to adjust the tension of the spring, a brake band on said brake drum, and means connected to the brake band and to the driving shaft and adapted to set the brake band when the driving shaft is moved endwise by the jack shaft to uncouple said coupling members.

PATTIE H. FARREN.

June 20, 1939.  K. FEND  2,163,515
INTERCHANGEABLE LEAD PENCIL
Filed July 22, 1937
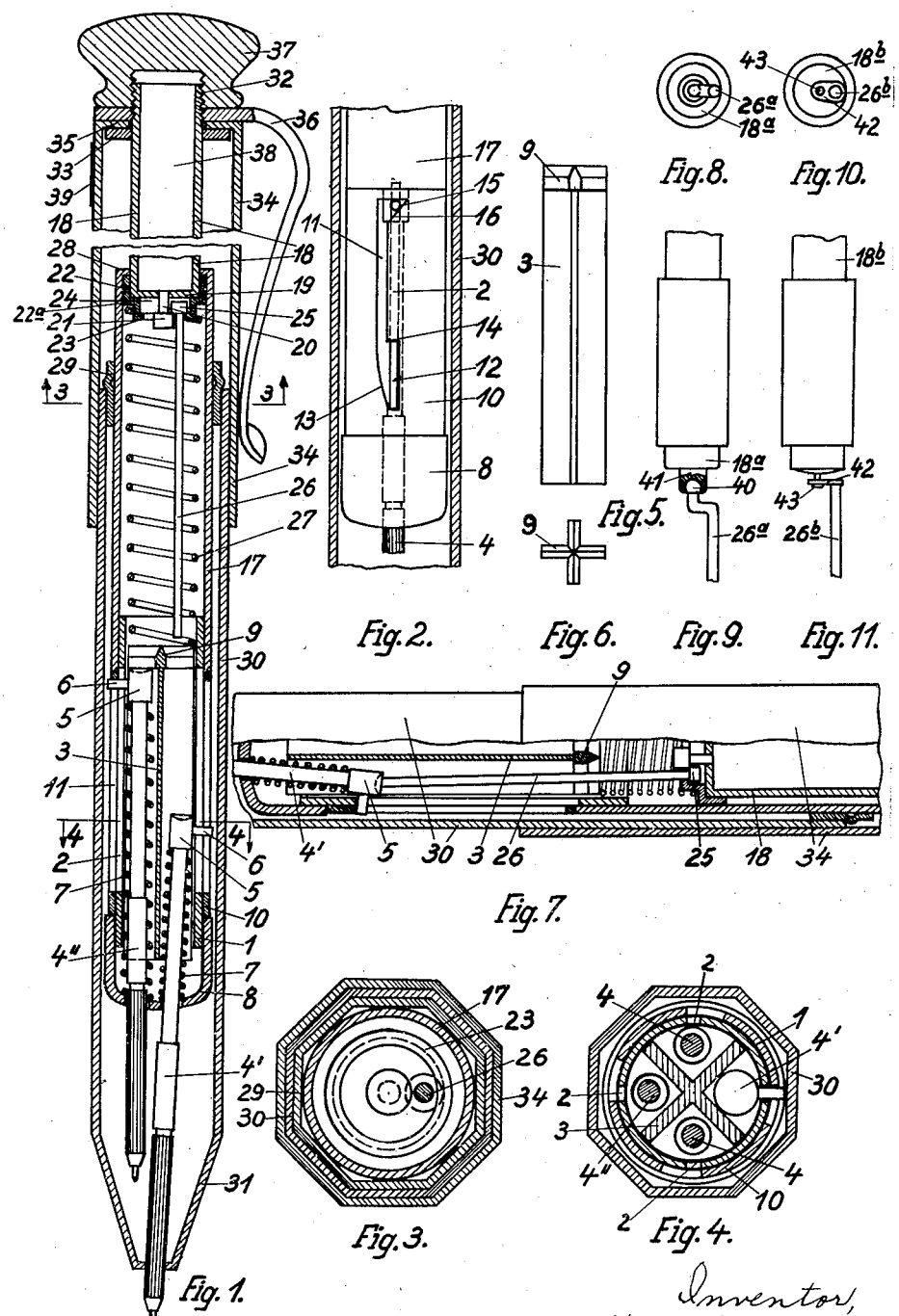
Inventor,
Kurt Fend,